(12) United States Patent
Kim et al.

(10) Patent No.: US 7,617,540 B2
(45) Date of Patent: Nov. 10, 2009

(54) METHOD FOR MANAGING DOWNLOAD OF DUPLICATE CONTENTS

(75) Inventors: Jin-Gu Kim, Seoul (KR); Seong-Joon Jeon, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 330 days.

(21) Appl. No.: 11/312,698

(22) Filed: Dec. 21, 2005

(65) Prior Publication Data

US 2006/0155727 A1    Jul. 13, 2006

(30) Foreign Application Priority Data

Jan. 7, 2005     (KR)     ............ 10-2005-0001871

(51) Int. Cl.
G06F 7/04     (2006.01)
G06F 17/30    (2006.01)
H04N 7/16     (2006.01)
G06F 7/00     (2006.01)

(52) U.S. Cl. .............. 726/26; 726/31; 726/32; 726/33; 726/20; 713/178; 705/51; 705/52; 707/100

(58) Field of Classification Search ............. 726/20–26; 705/51–52
See application file for complete search history.

(56) References Cited

U.S. PATENT DOCUMENTS

| 7,181,628 | B2 * | 2/2007 | Sato et al. ............... 713/189 |
| 7,216,363 | B2 * | 5/2007 | Serkowski et al. ............ 726/20 |
| 7,353,541 | B1 * | 4/2008 | Ishibashi et al. ............. 726/26 |
| 2004/0253942 | A1 * | 12/2004 | Mowry et al. .............. 455/410 |
| 2005/0071418 | A1 * | 3/2005 | Kjellberg et al. ............ 709/200 |
| 2005/0097052 | A1 * | 5/2005 | Systa et al. ................ 705/51 |

(Continued)

FOREIGN PATENT DOCUMENTS

| KR | 10-2003-0054249 A | * | 7/2003 |
| KR | 10-2004-0103743   | * | 12/2004 |
| KR | 10-05-14364       | * | 1/2005 |

OTHER PUBLICATIONS

Open Mobile Alliance, "DRM Specification V2.0—Draft Version 2.0—Apr. 20, 2004—Open Mobile Alliance—OMA-DRM-DRM-V2_0-20040420-D," Open Mobile Alliance Ltd. Apr. 20, 2004, all.*

(Continued)

Primary Examiner—Emmanuel L Moise
Assistant Examiner—Luu Pham
(74) Attorney, Agent, or Firm—Robert E. Bushnell, Esq.

(57) ABSTRACT

A method for managing downloads of contents. This method provides for a replay memory that stores a globally unique right object identifier (GUID) and a right issuer timestamp (RITS). A duplication memory is used to store a right object (RO) in downloading a duplicate of content that is already stored in the replay memory. When a right issuer timestamp (RITS) included in the right object (RO) of the currently received content is less than the current time plus the set threshold value, and the globally unique right object identifier (GUID) and the right issuer timestamp (RITS) of the received right object (RO) are already stored in the replay memory, the received right object (RO) is separately stored in the duplication memory in association with the globally unique right object identifier (GUID).

14 Claims, 5 Drawing Sheets

U.S. PATENT DOCUMENTS

2005/0209972 A1* 9/2005 Bjorkengren et al. ......... 705/57
2006/0047951 A1* 3/2006 Reilly et al. ................ 713/158
2006/0056324 A1* 3/2006 Hyyppa et al. .............. 370/310
2006/0059194 A1* 3/2006 Oh et al. .................. 707/103 R
2006/0080740 A1* 4/2006 Bremer et al. ................ 726/26
2006/0253400 A1* 11/2006 Okamoto et al. .............. 705/57

OTHER PUBLICATIONS

Open Mobile Alliance, "DRM Specification V2.0—Draft Version 2.0—Apr. 20, 2004—Open Mobile Alliance—OMA-DRM-DRM-V2_0-20040420-D," Open Mobile Alliance Ltd. Apr. 20, 2004, all.*

* cited by examiner

METHOD FOR MANAGING DOWNLOAD OF DUPLICATE CONTENTS

CLAIM OF PRIORITY

This application makes reference to, incorporates the same herein, and claims all benefits accruing under 35 U.S.C. §119 from an application for METHOD FOR MANAGING DUPLICATED DOWNLOADING THE IDENTICAL CONTENTS earlier filed in the Korean Intellectual Property Office on 7 Jan. 2005 and there duly assigned Ser. No. 2005-1871.

BACKGROUND OF THE INVENTION

1. Field of the Invention

The present invention relates to a method for managing download of contents in communication terminals such as portable telephones, and more particularly, to a method for managing download of the same contents as already-stored contents in communication terminals.

2. Description of the Related Art

With the recent developments in the communications industry, services provided by mobile communication systems have evolved into a multicasting multimedia service which transfers large-sized data such as packet data, circuit data, and the like, as well as provides a voice service.

Recent communication terminals have functions and programs comparable to personal computers. Portability and improved functions of the communication terminals themselves promote the use of additional functions by users. Basically, the communication terminals are able to store a considerable amount of data, such as telephone numbers and personal schedules, and output and edit the data as necessary.

In recent years, the communication terminals have become able to store and provide large-sized multimedia data, such as music, games and movies. For example, the communication terminals have functions of downloading and replaying various bell sounds or music files, which are not stored by the manufacturers, via an external communication interface from external communication devices, such as computers, or sound providers. The present invention is directed to a method for managing download of and replaying various content data using a communication terminal.

A communication terminal generally includes a data storage memory for storing contents provided by content providers and a usage-right storage memory for storing information about a right to use downloaded contents. The usage-right storage memory is called a replay cache memory and is hereinafter referred to simply as a replay memory.

The following is an example of a conventional replay memory that stores information about a right to use downloaded contents.

Open mobile alliance (OMA) digital right management (DRM) v2.0 specification specifies that a communication terminal has a replay cache memory to prevent downloaded contents from being replayed a limitless number of times. Thus, the communication terminal manages a globally unique right object (RO) identifier (GUID) and a right issuer timestamp (RITS) of contents.

For this, prior to downloading the contents, the communication terminal constructs the globally unique right object identifier (GUID) and the right issuer timestamp (RITS), provided by the content provider, as a table having a tree format, and stores and manages the table.

For reference, right related information including the globally unique right object identifier (GUID) includes content right information and content encryption key (CEK) information for decrypting encrypted contents. The information is used to decode the downloaded contents at the communication terminal. The information is forwarded to the communication terminal prior to downloading the content.

Examples of the right information include permission and constraints for contents. The permission information includes play, display, execute, print, and export. Further, the constraints include count, time-count, date time, interval, accumulated, individual, and system.

Among the above information, a content play right will be described herein. However, the present invention is likewise applicable to the other information.

The following is an example of a conventional method for managing download of contents in a communication terminal using the replay memory.

First, a communication terminal receives a right object (RO) containing a right issuer timestamp (RITS). The communication terminal then compares a content provision time included in the right issuer timestamp (RIFS) to a current time set in the communication terminal plus 24 hours. Here, the current time set in the communication terminal plus 24 hours is a reference time set to determine whether the right object (RO) is wrong.

If the content provision time is determined to be more than the current time set in the communication terminal plus 24 hours, the communication terminal determines based on time information provided by a base station whether the current time set in the communication terminal is correct. If the set current time is determined to be incorrect, the communication terminal accurately synchronizes the current time with the time provided by the base station.

If it is determined in that the set current time is correct, the communication terminal ignores the received right object (RO) and does not download content corresponding to the right object (RO) destined to be provided by the content provider.

On the other hand, if it is determined that the content provision time is not more than the current time set in the communication terminal plus 24 hours, the communication terminal compares the received right object (RO) to an entry stored in the replay memory. Specifically, the communication terminal determines whether the globally unique right object identifier (GUID) and the right issuer timestamp (RITS) corresponding to the received right object (RO) exist as entries in the replay memory.

If the globally unique right object identifier (GUID) and the right issuer timestamp (RITS) corresponding to the received right object (RO) are determined to exist as the entries in the replay memory, the communication terminal ignores the received right object (RO) and does not download the content corresponding to the right object (RO) destined to be provided by the content provider.

If it is determined in that the globally unique right object identifier (GUID) and the right issuer timestamp (RITS) corresponding to the received right object (RO) do not exist as the entries in the replay memory, the communication terminal recognizes that there is no same content information in the replay memory and determines whether there is an empty space in the replay memory. If it is determined that there is an empty space in the replay memory, the communication terminal accepts the received right object (RO) and stores the globally unique right object identifier (GUID) and the right issuer timestamp (RITS) corresponding to the received right object (RO) in the replay memory.

On the other hand, if it is determined that there is no empty space in the replay memory, the communication terminal determines whether the right issuer timestamp (RITS) of the received right object (RO) is earlier than the oldest entry stored in the replay memory. If the right issuer timestamp (RITS) of the received right object (RO) is earlier than the oldest entry stored in the replay memory, the communication terminal ignores the received right object (RO) and does not download content corresponding to the right object (RO) destined to be provided by the content provider.

On the other hand, if it is determined in that the right issuer timestamp (RITS) of the received right object (RO) is not earlier than the oldest entry stored in the replay memory, the communication terminal deletes an entry having the oldest right issuer timestamp (RITS) stored in the replay memory. The communication terminal then accepts the received right object (RO) and stores the globally unique right object identifier (GUID) and the right issuer timestamp. (RITS) of the received right object (RO) in an empty space of the replay memory from which the entry having the oldest right issuer timestamp (RITS) has been deleted.

Although a right for content paid and used by a user is about to expire, i.e., when the content has been replayed nine times and only one replay remains, the user might like to replay and listen to the content more than just once more. Normally, the user is allowed to re-purchase the same content when there is no remaining available replay count. However, in some cases the user may like to purchase the content in advance even when an available replay count remains.

When the user makes a download request for the same content, the communication terminal refuses a received right object (RO) and does not download the content since the existing downloaded globally unique right object identifier (GUID) and right issuer timestamp (RITS) entries remain in the replay memory. Thus, there is a need for a scheme to newly update an existing allocated use right (e.g., replay time) so that the same content is downloaded in duplicate even though the right is not all used and there remains content right related information in the replay memory.

SUMMARY OF THE INVENTION

It is an object of the present invention to provide a method for managing download of contents in a communication terminal, wherein even though a right to use existing downloaded content remains, the same content is allowed to be downloaded and used in succession to the remaining usage right.

It is another object of the present invention to provide a method for managing download of contents in a communication terminal that allows a new usage right to be successively used without deleting existing right information when a content usage right is determined to remain based on a right object (RO) for existing downloaded and used content.

It is yet another object of the present invention to provide a technique for managing download of contents in a communication terminal, that accommodates a highly flexible control over the use of the contents that is easy to implement and cost effective.

According to an aspect of the present invention, there is provided a method for managing download of contents, including: comparing a right issuer timestamp (RITS) included in a right object (RO) of currently received content to a current time plus a set threshold value; when the right issuer timestamp (RITS) is less than the current time plus the set threshold value, determining whether a globally unique right object identifier (GUID) and the right issuer timestamp (RITS) of the received right object (RO) are already stored; when the globally unique right object identifier (GUID) and the right issuer timestamp (RITS) of the received right object (RO) are already stored, separately storing the received right object (RO) in association with the globally unique right object identifier (GUID); and when the content right is determined to expire based on the already-stored globally unique right object identifier (GUID) and the right issuer timestamp (RITS), successively providing a usage right for the content according to the separately stored globally unique right object identifier (GUID) and right issuer timestamp (RITS) of the right object (RO).

The method may further include: when the right issuer timestamp (RITS) is more than the current time plus the set threshold value, determining whether the set current time is correct; and ignoring the right object (RO) of the currently received content when the set current time is correct, and synchronizing the set current time when the set current time is incorrect.

The method may include accepting the received right object (RO) and storing the globally unique right object identifier (GUID) and the right issuer timestamp (RITS) of-the right object (RO) when the globally unique right object identifier (GUID) and the right issuer timestamp (RITS) of the received right object (RO) are not already stored.

The method may further include: determining whether there is an empty space to store the globally unique right object identifier (GUID) and the right issuer timestamp (RITS) of the right object (RO) when the globally unique right object identifier (GUID) and the right issuer timestamp (RITS) of the received right object (RO) are not stored; when there is no empty space to store the globally unique right object identifier (GUID) and the right issuer timestamp (RITS) of the right object (RO), deleting an entry having the oldest right issuer timestamp (RITS) of the already-stored content; and storing the globally unique right object identifier (GUID) and the right issuer timestamp (RITS) of the right object (RO) in the empty space from which the entry is deleted.

The threshold value may be more than 24 hours.

According to another aspect of the present invention, there is provided a method for managing download of contents, including: providing a replay memory for storing a globally unique right object identifier (GUID) and a right issuer timestamp (RITS), and a duplication memory for storing a right object (RO) in downloading a duplicate of content that is already stored in the replay memory; comparing a right issuer timestamp (RITS) included in the right object (RO) of the currently received content to a current time plus a set threshold value; when the right issuer timestamp (RITS) is less than the current time plus the set threshold value, determining whether the globally unique right object identifier (GUID) and the right issuer timestamp (RITS) of the received right object (RO) are already stored in the replay memory; when the globally unique right object identifier (GUID) and the right issuer timestamp (RITS) of the received right object (RO) are already stored in the replay memory, separately storing the received right object (RO) in the duplication memory in association with the globally unique right object identifier (GUID); and when a content usage right is determined to expire based on the globally unique right object identifier (GUID) and the right issuer timestamp (RITS) which are already stored in the replay memory, continuously providing the content usage right according to the globally unique right object identifier (GUID) and the right issuer timestamp (RITS) of the right object (RO) stored in the duplication memory.

The step of storing may include: when the globally unique right object identifier (GUID) and the right issuer timestamp (RITS) of the received right object (RO) are already stored in the replay memory, determining whether there is an empty space in the duplication memory; when there is an empty space in the duplication memory, separately storing the received right object (RO) in the duplication memory in association with the globally unique right object identifier (GUID); and storing, in the replay memory, storage address information of the duplication memory where the received right object (RO) is stored, so that a reference is made to the storage address information upon fetching the unique right object identifier (GUID) stored in the duplication memory.

Storing the storage address information may include storing the storage address information in an area having an entry format associated with the globally unique right object identifier (GUID) and the right issuer timestamp (RITS) of the received right object (RO) stored in the replay memory.

The method may further include: determining whether the set current time is correct when the right issuer timestamp (RITS) is more than the current time plus the set threshold value; and synchronizing the set current time when the set current time is correct, ignoring the right object (RO) of the currently received content and when the set current time is incorrect.

The method may further include: determining whether there is an empty space in the replay memory to store the globally unique right object identifier (GUID) and the right issuer timestamp (RITS) of the right object (RO) when the globally unique right object identifier (GUID) and the right issuer timestamp (RITS) of the received right object (RO) are not stored in the replay memory; when there is an empty space in the replay memory, accepting the received right object (RO) and storing the globally unique right object identifier (GUID) and the right issuer timestamp (RITS) of the right object (RO) in the replay memory; and setting the storage address information for the globally unique right object identifier (GUID) and the right issuer timestamp (RITS) of the stored right object (RO) to NULL.

The method may further include: when there is no empty space in the replay memory to store the globally unique right object identifier (GUID) and the right issuer timestamp (RITS) of the right object (RO), deleting an entry having the oldest right issuer timestamp (RITS) for the already-stored content; storing the globally unique right object identifier (GUID) and the right issuer timestamp (RITS) of the right object (RO) in the empty space of the replay memory from which the entry is deleted; and setting the storage address information for the globally unique right object identifier (GUID) and the right issuer timestamp (RITS) of the stored right object (RO) to NULL.

The method may further include: determining whether the right issuer timestamp (RITS) of the right object (RO) is earlier than the oldest globally unique right object identifier (GUID) and right issuer timestamp (RITS) entries already stored in the replay memory when there is no empty space in the replay memory to store the globally unique right object identifier (GUID) and the right issuer timestamp (RITS) of the right object (RO); when the right issuer timestamp (RITS) of the right object (RO) is not earlier than the oldest entry already stored in the replay memory, deleting the oldest entry from the replay memory; storing the globally unique right object identifier (GUID) and the right issuer timestamp (RITS) of the right object (RO) in the empty space of the replay memory from which the oldest entry is deleted; and setting storage address information for the globally unique right object identifier (GUID) and the right issuer timestamp (RITS) of the stored right object (RO) to NULL.

In the content download method according to this embodiment, the replay memory and the duplication memory may be configured as one memory with divided storage areas. The threshold value may be set to 24 hours.

According to the present invention, when the right object (RO) of content for which a usage right remains is received, the received right object (RO) is separately stored and a storage address of the right object (RO) is updated such that when a usage right for existing downloaded content expires, the content is continuously downloaded and used according to the separately stored right object (RO), thereby enabling purchase of the same content in advance and thus continuous use of the content irrespective of an existing right.

In addition, when there is a request to replay the same content, use of the content is enabled according to a right stored in the replay memory and, when the right stored in the replay memory expires, use of the content is enabled through updating the replay memory with right information (object information) stored in the duplication memory. Thus, even when the usage right expires, a user is allowed to continuously use existing downloaded content without having to gain access to the content provider whenever the user would like to use the content.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
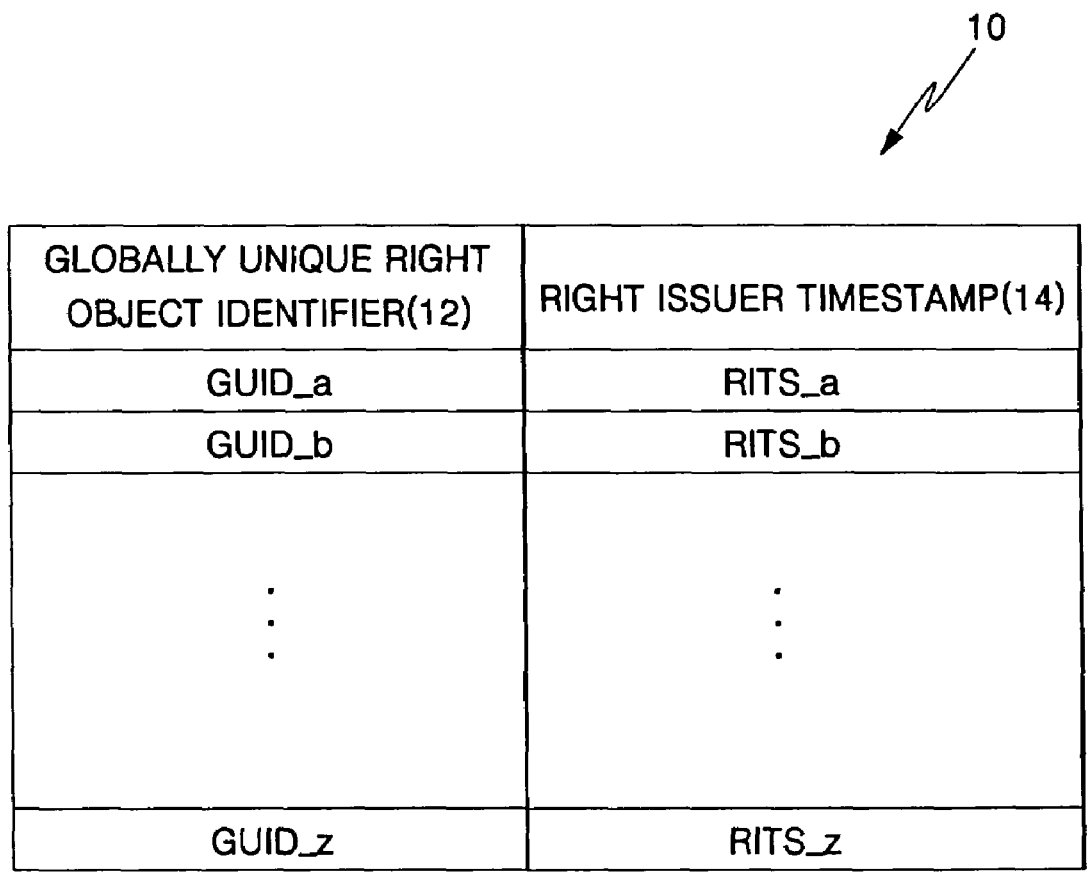
FIG. 1 shows an example of a conventional replay memory in which information about a right to use downloaded contents is stored.

Turning now to the drawings, FIG. 1 shows an example of a conventional replay memory that stores information about a right to use downloaded contents.

Open mobile alliance (OMA) digital right management (DRM) v2.0 specification specifies that a communication terminal has a replay cache memory 10 to prevent downloaded contents from being replayed a limitless number of times. Thus, the communication terminal manages a globally unique right object (RO) identifier (GUID) 12 and a right issuer timestamp (RITS) 14 of contents.

For this, prior to downloading the contents, the communication terminal constructs the globally unique right object identifier (GUID) 12 and the right issuer timestamp (RITS)

14, provided by the content provider, as a table having a tree format as shown in FIG. 1, and stores and manages the table.

For reference, right related information including the globally unique right object identifier (GUID) includes content right information and content encryption key (CEK) information for decrypting encrypted contents. The information is used to decode the downloaded contents at the communication terminal. The information is forwarded to the communication terminal prior to downloading the content.

Examples of the right information include permission and constraints for contents. The permission information includes play, display, execute, print, and export. Further, the constraints include count, time-count, date time, interval, accumulated, individual, and system.

Among the above information, a content play right will be described herein. However, the present invention is likewise applicable to the other information.

Figure 2:
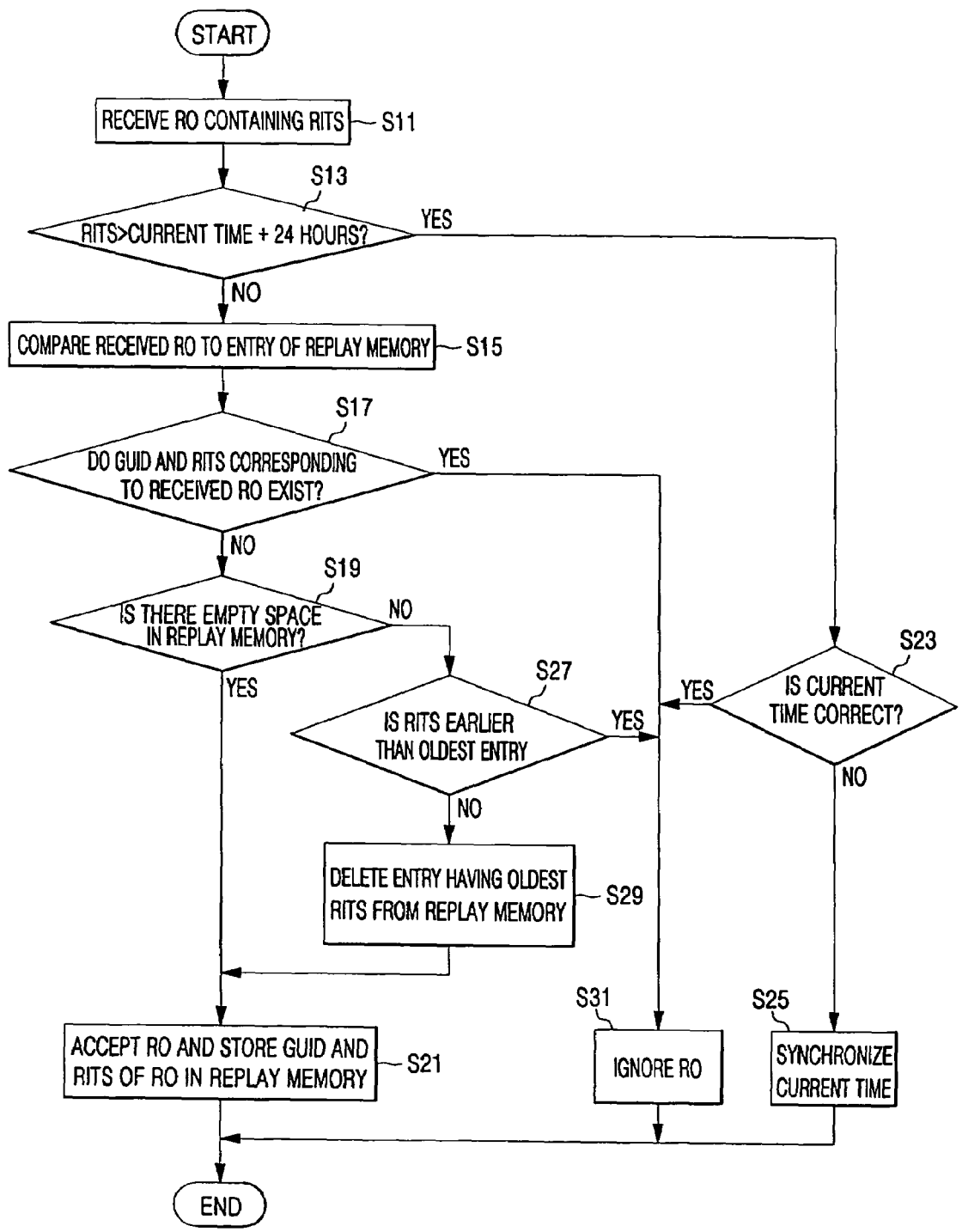
FIG. 2 is a flowchart showing an example of a conventional method for managing download of contents in a communication terminal using the replay memory of FIG. 1.

FIG. 2 is a flowchart showing an example of a conventional method for managing download of contents in a communication terminal using the replay memory 10 of FIG. 1.

First, a communication terminal receives a right object (RO) containing a right issuer timestamp (RITS) (S11). The communication terminal then compares a content provision time included in the right issuer timestamp (RITS) to a current time set in the communication terminal plus 24 hours (S13). Here, the current time set in the communication terminal plus 24 hours is a reference time set to determine whether the right object (RO) is wrong.

If the content provision time is determined to be more than the current time set in the communication terminal plus 24 hours, the communication terminal determines based on time information provided by a base station whether the current time set in the communication terminal is correct (S23). If the set current time is determined to be incorrect, the communication terminal accurately synchronizes the current time with the time provided by the base station (S25).

If it is determined in S23 that the set current time is correct, the communication terminal ignores the received right object (RO) and does not download content corresponding to the right object (RO) destined to be provided by the content provider (S31).

On the other hand, if it is determined in S13 that the content provision time is not more than the current time set in the communication terminal plus 24 hours, the communication terminal compares the received right object (RO) to an entry stored in the replay memory 10 (S15). Specifically, the communication terminal determines whether the globally unique right object identifier (GUID) and the right issuer timestamp (RITS) corresponding to the received right object (RO) exist as entries in the replay memory 10 (S17).

If the globally unique right object identifier (GUID) and the right issuer timestamp (RITS) corresponding to the received right object (RO) are determined to exist as the entries in the replay memory 10, the communication terminal ignores the received right object (RO) and does not download the content corresponding to the right object (RO) destined to be provided by the content provider (S31).

If it is determined in S17 that the globally unique right object identifier (GUID) and the right issuer timestamp (RITS) corresponding to the received right object (RO) do not exist as the entries in the replay memory 10, the communication terminal recognizes that there is no same content information in the replay memory 10 and determines whether there is an empty space in the replay memory 10 (S19). If it is determined that there is an empty space in the replay memory 10, the communication terminal accepts the received right object (RO) and stores the globally unique right object identifier (GUID) and the right issuer timestamp (RITS) corresponding to the received right object (RO) in the replay memory 10 (S21).

On the other hand, if it is determined in S19 that there is no empty space in the replay memory 10, the communication terminal determines whether the right issuer timestamp (RITS) of the received right object (RO) is earlier than the oldest entry stored in the replay memory 10 (S27). If the right issuer timestamp (RITS) of the received right object (RO) is earlier than the oldest entry stored in the replay memory 10, the communication terminal ignores the received right object (RO) and does not download content corresponding to the right object (RO) destined to be provided by the content provider (S31).

On the other hand, if it is determined in S27 that the right issuer timestamp (RITS) of the received right object (RO) is not earlier than the oldest entry stored in the replay memory 10, the communication terminal deletes an entry having the oldest right issuer timestamp (RITS) stored in the replay memory 10 (S29). The communication terminal then accepts the received right object (RO) and stores the globally unique right object identifier (GUID) and the right issuer timestamp (RITS) of the received right object (RO) in an empty space of the replay memory 10 from which the entry having the oldest right issuer timestamp (RITS) has been deleted (S21).

Although a right for content paid and used by a user is about to expire, i.e., when the content has been replayed nine times and only one replay remains, the user might like to replay and listen to the content more than just once more. Normally, the user is allowed to re-purchase the same content when there is no remaining available replay count. However, in some cases the user may like to purchase the content in advance even when an available replay count remains.

When the user makes a download request for the same content, the communication terminal refuses a received right object (RO) and does not download the content since the existing downloaded globally unique right object identifier (GUID) and right issuer timestamp (RITS) entries remain in the replay memory 10, as shown in FIG. 2. Thus, there is a need for a scheme to newly update an existing allocated use right (e.g., replay time) so that the same content is downloaded in duplicate even though the right is not all used and there remains content right related information in the replay memory 10.

The present invention will now be described more fully with reference to the accompanying drawings, in which preferred embodiments of the invention are shown. This invention may, however, be embodied in different forms and should not be construed as being limited to the embodiments set forth herein. Rather, these embodiments are provided so that this disclosure will be thorough and complete, and will fully convey the concept of the invention to those skilled in the art.

Figure 3:
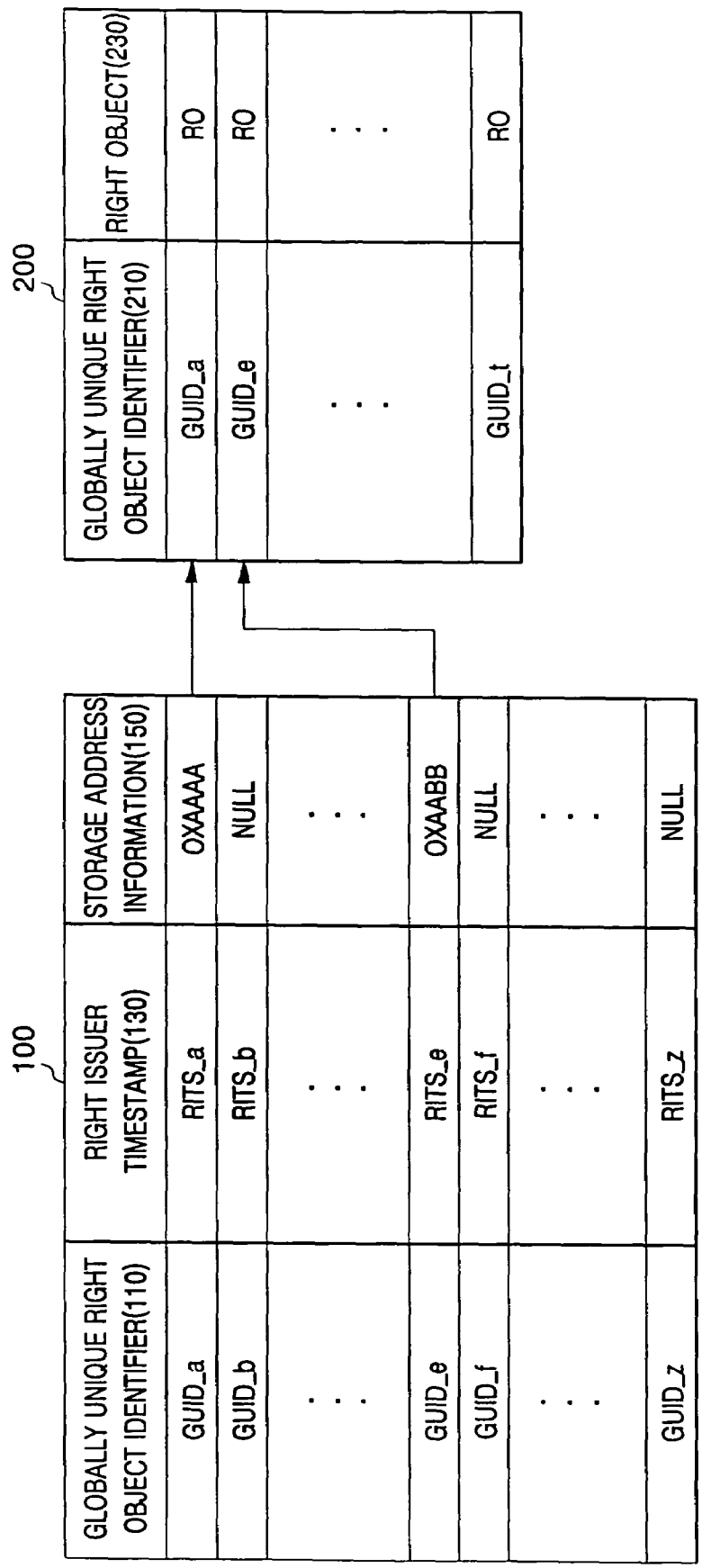
FIG. 3 shows a structure of a memory that stores information about a content usage right to download and manage duplicate content according to a preferred embodiment of the present invention.

FIG. 3 shows a structure of a memory that stores information about a content usage right to download and manage duplicate content according to a preferred embodiment of the present invention.

The present invention includes a duplication memory 200, as well as a replay memory 100 that stores constraints which are not deleted because an existing usage right remains. The duplication memory 200 stores globally unique right object identifier (GUID) 210, 110 stored in the replay memory 100 and a right object (RO) 230 having the same value as a right issuer timestamp (RITS).

The replay memory 100 stores a globally unique right object identifier (GUID) 110, a right issuer timestamp 130, and storage address information 150 in the form of a table having a tree format. The globally unique right object identifier 110 is information about an object having a content usage right, the right issuer timestamp 130 is time information provided by a provider having a content right, and the storage address information 150 is information about an address of the duplication memory 200 where the right object (RO) 230 is stored according to the present invention.

The duplication memory 200 stores the globally unique right object identifier 210 and the right object (RO) 230. The globally unique right object identifier 210 is information about an object having a content usage right, and is the same globally unique right object identifier as the globally unique right object identifier (GUID) 110 already stored in the replay memory 100.

In the present invention, the communication terminal does not ignore a currently received right object (RO) and stores the right object (RO) in the duplication memory 200 when the communication terminal discovers globally unique right object identifier (GUID) 110 and right issuer timestamp (RITS) 130 entries in the replay memory 100 that are the same as the received right object (RO). Thereafter, if the globally unique right object identifier (GUID) and the right issuer timestamp (RITS) that are the same as the received right object (RO), which are stored in the replay memory 100, are deleted due to usage expiration, the communication terminal automatically updates the replay memory 100 with the right object (RO) stored in the duplication memory 200. In the present invention, for the same content, only the right object (RO) rather than detailed content information is stored, which does not affect the use of the memory.

In the present invention, the replay memory 100 and the duplication memory 200 may be configured as different memories. Alternatively, they may be configured as different storage areas in one memory depending on information type.

Figure 4:
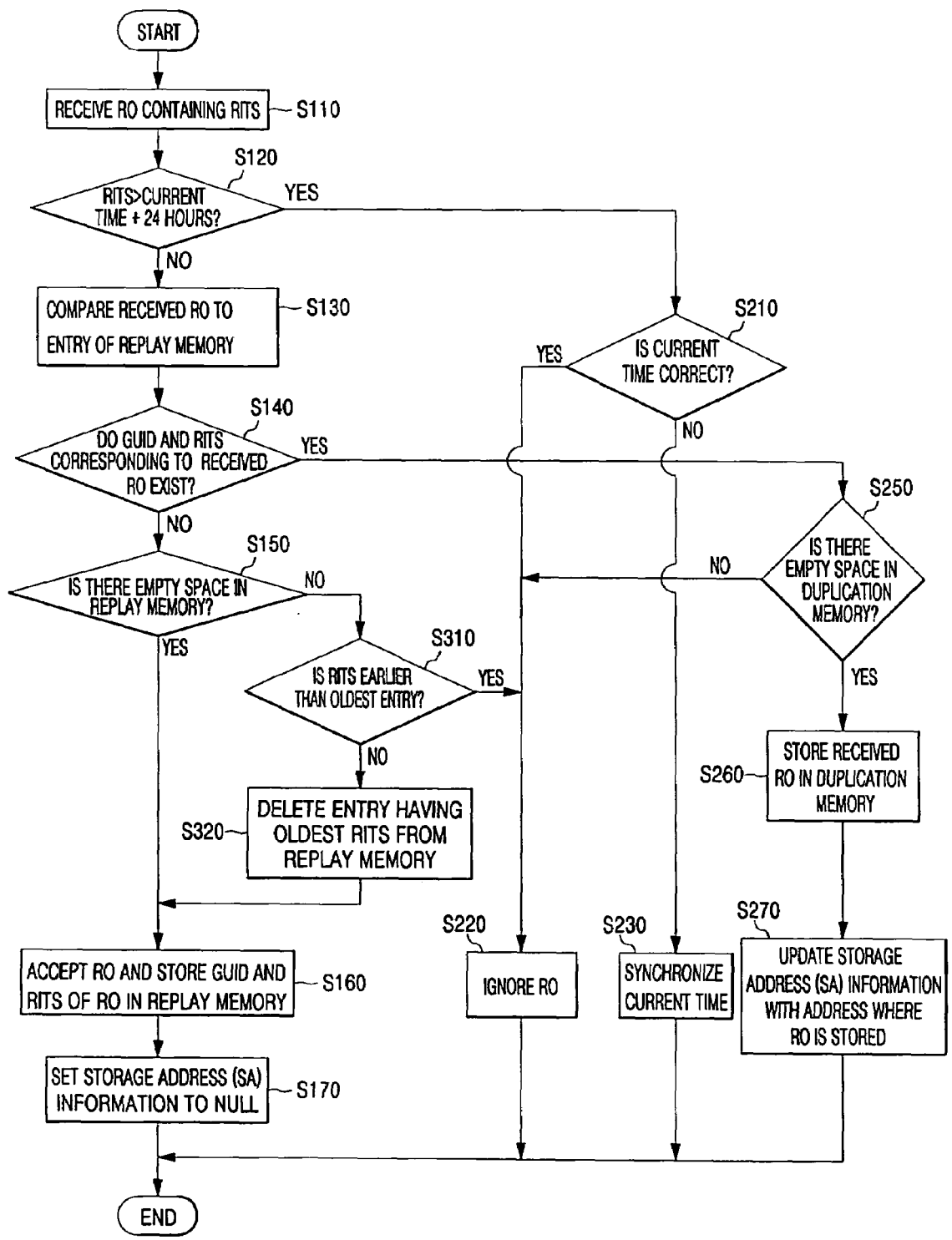
FIG. 4 is a flowchart illustrating a method for managing download of the same content using a replay memory and a duplication memory in a communication terminal according to a preferred embodiment of the present invention.

FIG. 4 is a flowchart illustrating a method for managing download of the same content using a replay memory and a duplication memory in a communication terminal according to a preferred embodiment of the present invention.

First, the communication terminal receives a right object (RO) including a right issuer timestamp (RITS) (S110). The communication terminal then compares a content provision time included in the right issuer timestamp (RITS) to a current time set in the communication terminal plus a predetermined time, for example 24 hours (S120). Here, the current time set in the communication terminal plus 24 hours is a reference time set to determine whether the right object (RO) is wrong.

If the content provision time is determined to be more than the current time set in the communication terminal plus 24 hours, the communication terminal determines based on the time information provided by a base station whether the current time set in the communication terminal is correct (S210). If the set current time is determined to be incorrect, the communication terminal synchronizes the current time with the accurate time provided by the base station (S230).

If it is determined in S210 that the set current time is correct, the communication terminal ignores the received right object (RO) and does not download content corresponding to the right object (RO) destined to be provided by the content provider (S220).

On the other hand, if it is determined in S120 that the content provision time is not more than the current time set in the communication terminal plus 24 hours, the communication terminal compares the received right object (RO) to the entry stored in the replay memory 100 (S130). The communication terminal then determines whether the globally unique right object identifier (GUID) and right issuer timestamp (RITS) corresponding to the received right object (RO) exist as entries in the replay memory 100 (S140).

If the globally unique right object identifier (GUID) and the right issuer timestamp (RITS) corresponding to the received right object (RO) are determined to exist as the entries in the replay memory 100, the communication terminal determines whether there is an empty space in the duplication memory 200 (S250). If it is determined that there is no empty space in the duplication memory 200, the communication terminal ignores the received right object (RO) and does not download the content corresponding to the right object (RO) destined to be provided by the content provider (S220).

If it is determined in S250 that there is empty space in the duplication memory 200, the communication terminal stores the received right object (RO) in the duplication memory 200 (S260). At this time, the communication terminal updates a storage address (SA) (150) area of the replay memory 100 with an address of the duplication memory 200 where the received right object (RO) is stored (S270). Preferably, the communication terminal updates the storage address area of the entries of the replay memory 100 where the globally unique right object identifier (GUID) and the right issuer timestamp (RITS) corresponding to the received right object (RO) are stored, with the address information of the received right object (RO) stored in the duplication memory 200.

On the other hand, if it is determined in S140 that the globally unique right object identifier (GUID) and the right issuer timestamp (RITS) corresponding to the received right object (RO) do not exist as the entries in the replay memory 100, the communication terminal recognizes that there is no same information as the received contents information in the replay memory 100 and determines whether there is an empty space in the replay memory 100 (S150). If it is determined that there is an empty space in the replay memory 100, the communication terminal accepts the received right object (RO) and stores the globally unique right object identifier (GUID) and right issuer timestamp (RITS) corresponding to the received right object (RO) in the replay memory 100 (S160). At this time, the communication terminal sets the storage address (SA) information as 'NULL' because it does not store the received right object (RO) in the duplication memory 200 (S170).

On the other hand, if it is determined in S150 that there is no empty space in the replay memory 100, the communication terminal determines whether the right issuer timestamp (RITS) of the received right object (RO) is earlier than the oldest entry stored in the replay memory 100 (S310). If the right issuer timestamp (RITS) of the received right object (RO) is determined to be earlier than the oldest entry stored in the replay memory 100, the communication terminal ignores the received right object (RO) and does not download the content corresponding to the right object (RO) destined to be provided by the content provider (S220).

On the other hand, if it is determined in S310 that the right issuer timestamp (RITS) of the received right object (RO) is not earlier than the oldest entry stored in the replay memory 100, the communication terminal deletes an entry having the oldest right issuer timestamp (RITS) stored in the replay memory 100 (S320). The communication terminal then accepts the received right object (RO) and stores the globally unique right object identifier (GUID) and the right issuer timestamp (RITS) of the received right object (RO) in the empty space of the replay memory 100 from which the entry having the oldest right issuer timestamp (RITS) has been deleted (S160). Further, the communication terminal sets the storage address (SA) information of the replay memory 100 to 'NULL' (S170).

Thus, when the right object (RO) of content for which a usage right remains is received, the received right object (RO) is separately stored and a storage address of the right object (RO) is updated such that when a usage right for existing downloaded content expires, the content is continuously downloaded and used according to the separately stored right object (RO), thereby enabling purchase of the same content in advance and thus continuous use of the content irrespective of an existing right.

Figure 5:
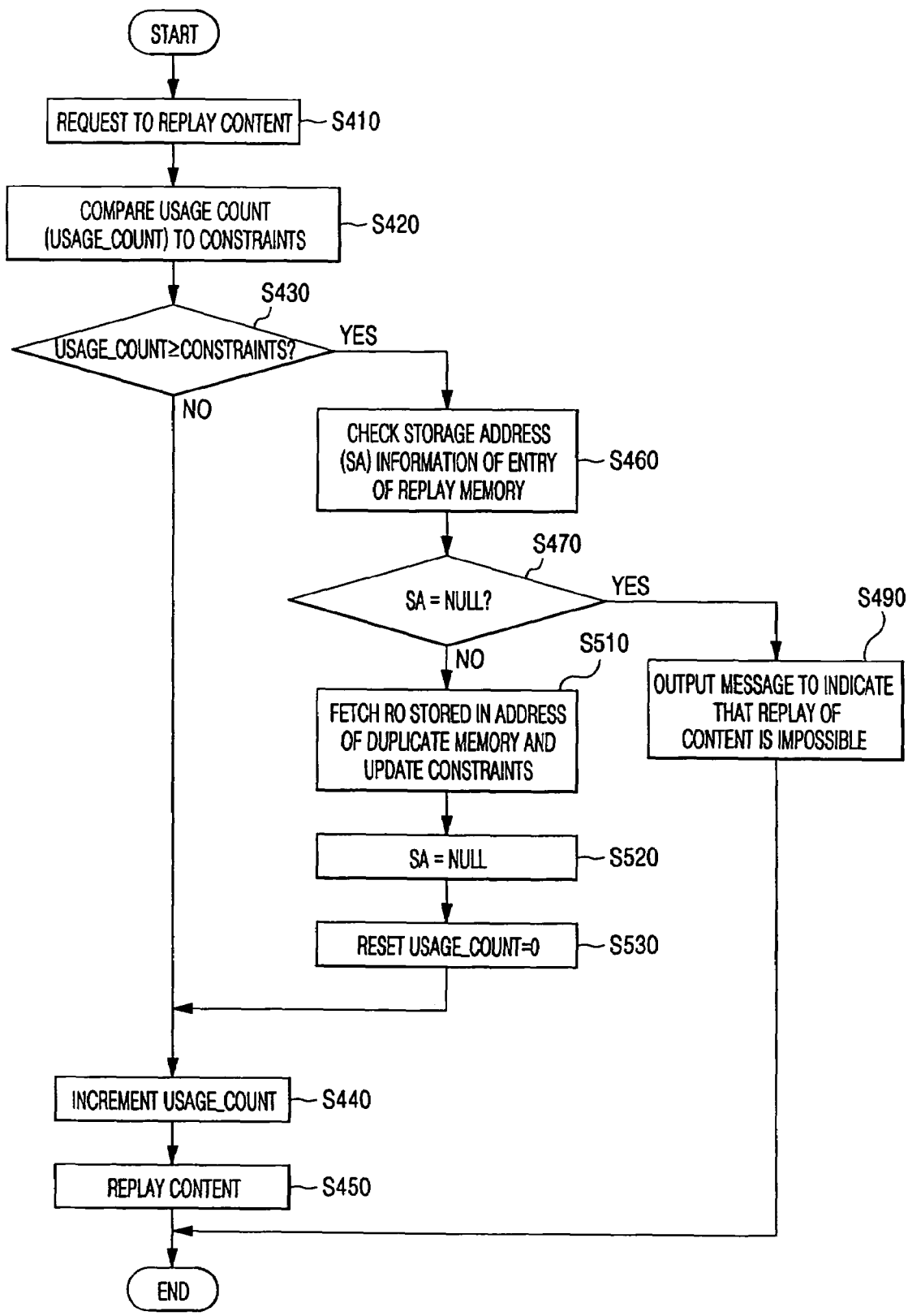
FIG. 5 is a flowchart illustrating a process of replaying the same content using a method for managing download of the same content according to the present invention.

FIG. 5 is a flowchart illustrating a process of replaying the same content using a method for managing download of the same content according to the present invention. This embodiment will be described by taking content such as music needing the play contained in the permission information as an example. The content is not limited to music as it is shown only as an example. The content can include a plurality of other forms such as video, text based data, multimedia content etc.

First, upon receipt of a request to replay downloaded content (S410), the communication terminal compares a content usage count (usage_count) to a count contained in the constraints (S420). The communication terminal then determines whether the content usage count (usage_count) is more than the count in the constraints (S430).

If the content usage count (usage_count) is not more than the count in the constraints, the communication terminal increments the content usage count (usage_count) by '1' because the content usage right is not all used up (S440). It allows the communication terminal to replay the content in response to the request to replay the content (S450).

On the other hand, if it is determined in S430 that the content usage count (usage_count) is more than the count in the constraints, the communication terminal checks the replay memory 100, storage address (SA) information 150 of the entry of the content requested to be replayed (S460). The communication terminal then determines whether the storage address (SA) information 150 of the entry of the content requested to be replayed is 'NULL' (S470).

If the storage address (SA) information 150 of the entry of the content requested to be replayed is determined to be 'NULL', the communication terminal outputs a message via a user interface to indicate that replay of the content is impossible (S490). If it is determined in S470 that the storage address (SA) information 150 of the entry of the content requested to be replayed is not 'NULL', the communication terminal detects address information of the duplication memory 200 where the right object (RO) of the content requested to be replayed is stored and updates the replay memory 100 with the permission containing content count information (S510).

The communication terminal then sets the storage address (SA) information 150 of the entry of the content requested to be replayed as 'NULL' (S520). Further, the communication terminal resets the content usage count (usage_count) to '0' (usage_count=0) (S530). Accordingly, the communication terminal raises the content usage count (usage_count) by '1' increment to replay the content (S440). It allows the communication terminal to then replay the content in response to the request to replay the content (S450).

Thus, when there is a request to replay the same content, permission to use the content is granted depending on a right stored in the replay memory 100, and when the right stored in the replay memory 100 expires, use of the content is enabled by updating the replay memory 100 with right information (object information) stored in the duplication memory 200. Thus, even when the usage right expires, a user is allowed to continue using existing downloaded content without having to gain access to the content provider whenever the user would like to use the content.

According to the present invention, when the right object (RO) of content for which a usage right remains is received, the received right object (RO) is separately stored and a storage address of the right object (RO) is updated such that when a usage right for existing downloaded content expires, the content is continuously downloaded and used according to the separately stored right object (RO), thereby enabling purchase of the same content in advance and thus continuous use of the content irrespective of an existing right.

In addition, when there is a request to replay the same content, use of the content is enabled depending on a right stored in the replay memory, and when the right stored in the replay memory expires, use of the content is enabled by updating the replay memory with right information (object information) stored in the duplication memory. Thus, even when the usage right expires, the user is allowed to continuously use existing downloaded content without having to gain access to the content provider whenever the user would like to use the content.

The present invention can be realized as computer-executable instructions in computer_readable media. The computer_readable media includes all possible kinds of media in which computer_readable data is stored or included or can include any type of data that can be read by a computer or a processing unit. The computer_readable media include for example and not limited to storing media, such as magnetic storing media (e.g., ROMs, floppy disks, hard disk, and the like), optical reading media (e.g., CD_ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer_readable media can store and execute computer_readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

An example of a computer, but not limited to this example of the computer, that can read computer readable media that includes computer-executable instructions of the present invention includes a processor that controls the computer. The processor uses the system memory and a computer readable memory device that includes certain computer readable recording media. A system bus connects the processor to a network interface , modem or other interface that accommodates a connection to another computer or network such as the Internet. The system bus may also include an input and output interface that accommodates connection to a variety of other devices.

While the present invention has been described with reference to exemplary embodiments thereof, it will be understood by those skilled in the art that various changes in form and detail may be made therein without departing from the scope of the present invention as defined by the following claims.

What is claimed is:

1. A method for managing download of contents in a communication terminal, comprising:
   comparing a right issuer timestamp included in a right object of currently received content to a current time plus a set threshold value;
   when said right issuer timestamp is less than the current time plus the set threshold value, determining whether a globally unique right object identifier and said right issuer timestamp of said received right object are already stored in the replay memory of said communication terminal;
   when said globally unique right object identifier and said right issuer timestamp of said received right object are already stored, separately storing in a duplication memory said received right object in association with said globally unique right object identifier; and
   when the content right is determined to expire based on the already-stored globally unique right object identifier and said right issuer timestamp, successively providing a usage right for the content according to said separately stored globally unique right object identifier and right issuer timestamp of said right object.

2. The method according to claim 1, further comprising:
   when said right issuer timestamp is more than the current time plus the set threshold value, determining whether the set current time is correct; and
   ignoring said right object of the currently received content when the set current time is correct, and synchronizing the set current time when the set current time is incorrect.

3. The method according to claim 1, further comprising:
   when said globally unique right object identifier and said right issuer timestamp of said received right object are not already stored, accepting said received right object and storing the globally unique right object identifier and said right issuer timestamp of said right object.

4. The method according to claim 1, further comprising steps of:
   when said globally unique right object identifier and said right issuer timestamp of said received right object are not stored, determining whether there is an empty space to store said globally unique right object identifier and said right issuer timestamp of said right object;
   when there is no empty space to store said globally unique right object identifier and the right issuer timestamp of said right object, deleting an entry having the oldest right issuer timestamp of the already-stored content; and
   storing said globally unique right object identifier and said right issuer timestamp of said right object in the empty space from which the entry is deleted.

5. The method according to claim 1, wherein the threshold value is more than 24 hours.

6. A method for managing download of contents in a communication terminal, comprising:
   providing a replay memory for storing a globally unique right object identifier and a right issuer timestamp, and a duplication memory for storing a right object in downloading a duplicate of content that is already stored in said replay memory of said communication terminal;
   comparing a right issuer timestamp included in said right object of currently received content to a current time plus a set threshold value;
   when said right issuer timestamp is less than the current time plus the set threshold value, determining whether said globally unique right object identifier and said right issuer timestamp of said received right object are already stored in said replay memory;
   when said globally unique right object identifier and said right issuer timestamp of said received right object are already stored in said replay memory, separately storing said received right object in said duplication memory in association with said globally unique right object identifier; and
   when a content usage right is determined to expire based on said globally unique right object identifier and said right issuer timestamp which are already stored in the replay memory, continuously providing the content usage right according to said globally unique right object identifier and said right issuer timestamp of said right object stored in said duplication memory.

7. The method according to claim 6, wherein storing comprises:
   when said globally unique right object identifier and said right issuer timestamp of said received right object are already stored in the replay memory, determining whether there is an empty space in said duplication memory;
   when there is the empty space in said duplication memory, separately storing said received right object in said duplication memory in association with said globally unique right object identifier; and
   storing, in said replay memory, storage address information of said duplication memory where said received right object is stored, so that a reference is made to the storage address information upon fetching the unique right object identifier stored in said duplication memory.

8. The method according to claim 7, wherein said storing of the storage address information comprises a storing the storage address information in an area including an entry format associated with said globally unique right object identifier and said right issuer timestamp of said received right object stored in said replay memory.

9. The method according to claim 6, further comprising:
   when said right issuer timestamp is more than the current time plus the set threshold value, determining whether the set current time is correct; and
   ignoring the right object of the currently received content when the set current time is correct and synchronizing the set current time when the set current time is incorrect.

10. The method according to claim 7, further comprising:
    when said globally unique right object identifier and said right issuer timestamp of said received right object are not stored in said replay memory, determining whether there is an empty space in said replay memory to store said globally unique right object identifier and said right issuer timestamp of said right object;
    when there is the empty space in the replay memory, accepting said received right object and storing said globally unique right object identifier and said right issuer timestamp of said right object in said replay memory; and setting the storage address information for said globally unique right object identifier and said right issuer timestamp of the stored right object to NULL.

11. The method according to claim 10, further comprising:

when there is no empty space in said replay memory to store said globally unique right object identifier and said right issuer timestamp of said right object, deleting an entry having the oldest right issuer timestamp for the already-stored content;

storing said globally unique right object identifier and said right issuer timestamp of said right object in the empty space of the replay memory from which the entry is deleted; and setting the storage address information for said globally unique right object identifier and said right issuer timestamp of the stored right object to NULL.

12. The method according to claim 10, further comprising:

when there is no empty space in said replay memory to store said globally unique right object identifier and said right issuer timestamp of said right object, determining whether said right issuer timestamp of said right object is earlier than the oldest globally unique right object identifier and right issuer timestamp entries already stored in the replay memory;

when said right issuer timestamp of said right object is not earlier than the oldest entry already stored in said replay memory, deleting the oldest entry from said replay memory;

storing said globally unique right object identifier and said right issuer timestamp of said right object in the empty space of the replay memory from which the oldest entry is deleted; and setting storage address information for said globally unique right object identifier and said right issuer timestamp of the stored right object to NULL.

13. The method according to claim 6, wherein said replay memory and the duplication memory are configured as one memory with divided storage areas.

14. The method according to claim 6, wherein the threshold value is more than 24 hours.

* * * * *